United States Patent
Dixon et al.

(10) Patent No.: US 9,381,722 B2
(45) Date of Patent: Jul. 5, 2016

(54) MANUFACTURING PROCESS FOR GLAZING WITH INTEGRAL WIRING

(75) Inventors: Jonathan Barclay Dixon, Ormskirk (GB); Mark Andrew Chamberlain, Ormskirk (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 538 days.

(21) Appl. No.: 13/642,050

(22) PCT Filed: Mar. 23, 2011

(86) PCT No.: PCT/GB2011/050584
§ 371 (c)(1),
(2), (4) Date: Nov. 13, 2012

(87) PCT Pub. No.: WO2011/131958
PCT Pub. Date: Oct. 27, 2011

(65) Prior Publication Data
US 2013/0056135 A1    Mar. 7, 2013

(30) Foreign Application Priority Data
Apr. 20, 2010    (GB) .................................. 1006589.4

(51) Int. Cl.
*B32B 17/10*    (2006.01)
*E06B 3/66*    (2006.01)
(Continued)

(52) U.S. Cl.
CPC ..... *B32B 17/10376* (2013.01); *B32B 17/10761* (2013.01); *B32B 17/10807* (2013.01);
(Continued)

(58) Field of Classification Search
CPC ................... B32B 17/10376; B32B 17/10761; B32B 17/10926; H05B 3/86; H05B 2203/017
See application file for complete search history.

(56) References Cited

U.S. PATENT DOCUMENTS 3,409,759 A    11/1968    Boicey et al.
3,434,861 A *   3/1969    Luc .............................. 427/264
(Continued)

FOREIGN PATENT DOCUMENTS

EP    0 643 548 A2    3/1995
GB    972 453    10/1964
(Continued)

OTHER PUBLICATIONS

International Search Report (PCT/ISA/210) issued on Jun. 1, 2011, by the European Patent Office as the International Searching Authority for International Application No. PCT/GB2011/050584.
(Continued)

*Primary Examiner* — Christopher Schatz
(74) *Attorney, Agent, or Firm* — Buchanan Ingersoll & Rooney PC

(57) ABSTRACT

An improved process for fabrication of laminated glazings incorporating conductors such as heating elements is described. During assembly of the glazing, a solution comprising the same polymer material as the interlayer is applied to the conductors and allowed to dry prior to fitting a glazing sheet on top. This gives rise to a thin coating of polymer around the conductors and subsequent heat treatment causes the this coating and the main polymer interlayer to soften and fuse. The resulting structure shows improved encapsulation of the conductors (wires and busbars) with greater resistance to water ingress at the edge of the glazing.

13 Claims, 2 Drawing Sheets

Figure 1:
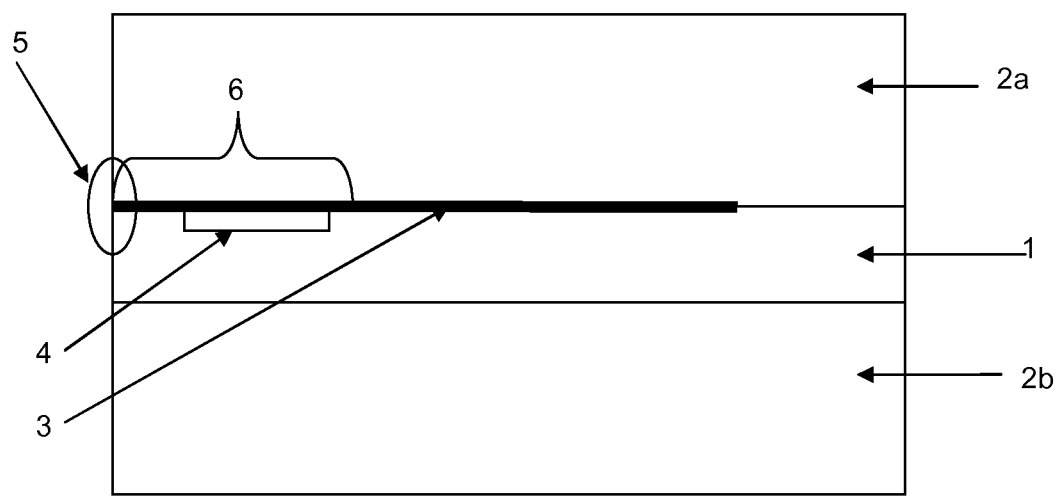

(51) Int. Cl.
*E06B 3/673* (2006.01)
*H05B 3/86* (2006.01)

(52) U.S. Cl.
CPC ............ *B32B17/10926* (2013.01); *E06B 3/66* (2013.01); *E06B 3/673* (2013.01); *H05B 3/86* (2013.01); *H05B 2203/017* (2013.01)

(56) References Cited

U.S. PATENT DOCUMENTS

| | | | |
|---|---|---|---|
| 3,440,408 A | | 4/1969 | Brittan |
| 3,601,583 A | | 8/1971 | Fujiwara |
| 3,629,040 A | * | 12/1971 | Hinton .............. B32B 17/10036 156/273.9 |
| 3,790,752 A | | 2/1974 | Boaz et al. |
| 4,644,139 A | | 2/1987 | Harrison et al. |
| 5,246,764 A | * | 9/1993 | LaPorte et al. ............. 428/195.1 |
| 5,445,694 A | | 8/1995 | Gillner et al. |
| 5,487,939 A | * | 1/1996 | Phillips et al. ................ 428/334 |
| 6,001,482 A | * | 12/1999 | Anderson et al. .......... 428/32.24 |
| 2010/0266832 A1 | | 10/2010 | Derda |

FOREIGN PATENT DOCUMENTS

| | | |
|---|---|---|
| GB | 1 300 276 A | 12/1972 |
| GB | 1418812 A | 12/1975 |
| GB | 1432034 A | 4/1976 |
| WO | 2004/009350 A1 | 1/2004 |
| WO | 2006/010698 A1 | 2/2006 |
| WO | WO 2009/059980 A1 | 5/2009 |

OTHER PUBLICATIONS

Search Report dated Aug. 23, 2010, issued by the United Kingdom Patent Office in the corresponding United Kingdom Patent Application No. GB1006589.4. (1 pages).

* cited by examiner

MANUFACTURING PROCESS FOR GLAZING WITH INTEGRAL WIRING

The invention concerns a process for incorporation of wires in laminated glazing.

The manufacture of laminated glazing for use in, for example, vehicles or buildings has been well known for many years. In a typical example, an interlayer of polymer material such as polyvinyl butyral (PVB) is incorporated between layers of glass to provide an optically clear safety glazing.

Incorporation of wires in such glazings, serving as (e.g.) heating elements or antennas is also well known. Thin wires (for example, tungsten), are typically laid down on the interlayer during manufacture and become embedded therein as the glazing assembly bonded together by heat treatment.

The diameter of the wires are is usually selected to offer little or no impediment to vision through the glazing although electric current may be provided to the wires via a busbar, which might comprise tinned copper or a layer of conductive ink printed on one of the assembly sheets. For a vehicle glazing, e.g. a windscreen, the busbar is usually located in the obscuration band—a peripheral region of the glazing which is opaque by virtue of a screen printed ceramic ink.

As a result of at least some manufacturing processes, the wires extend from the main body of the glazing, over (and contacting) the busbar and continue to the edge of the laminated assembly. During the laminating process, the polymer interlayer material softens under the action of heat and flows around the wire and this action normally serves to provide a seal against water ingress. Nevertheless during service, there remains a small possibility of water contacting the edge of the laminate where the wires reach, and flowing by capillary action along voids left by incomplete flow of polymer.

Such water ingress could, in theory, cause premature corrosion and failure of the wiring and internal busbar.

It is known to apply a solution of the polymer interlayer material over the wires in order to retain them in place during the manufacturing process. GB 972,453 discloses a process whereby a solution of interlayer material, which may be PVB in chloroform, is applied for this purpose.

U.S. Pat. No. 3,601,583 describes a manufacturing process where a structure comprising thin wires sandwiched between thin layers of PVB is achieved by spraying a solution of PVB on to a polyethylene layer; placing the wires on the thin PVB layer obtained after drying and then applying another thin PVB layer on top, again by spraying a solution. Another polyethylene layer may be applied but these layers do not form a bond with the thin PVB layers and may be removed during subsequent processing.

None of the prior art is directed to the potential problem of water ingress from the edge of the laminate, along the integrated wires.

According to the invention, a method of manufacturing a laminated glazing sheet comprises the steps set out in claim 1 attached hereto.

The film of second thermoplastic polymer may be applied by a number of means including, for example, by laying a solid sheet of the material over the electrical conductors. However, the film may conveniently be realised by applying a solution of the second thermoplastic polymer material to the conductors. Upon drying of the solution, a film of the polymer remains.

The choice of materials for the first and second thermoplastic polymers is constrained by the requirement that they should fuse together when brought into contact in a molten state. Preferably, the first and second thermoplastic polymers are the same material.

Preferably, the region of the interlayer extends to said edge. The polymer solution is preferably selected, in terms of solvent and concentration, to provide drying of the applied solution in less than five minutes, more preferably in less than three minutes, most preferably in less than sixty seconds.

A preferred material for the polymer interlayer is PVB and this may be dissolved in methanol to provide the solution. Preferably, the concentration of PVB in methanol is less than 40% by weight, more preferably less than 20% by weight, most preferably between 5% and 15%.

The solution may be applied by any of a number of means including roller application, felt pad application and spraying. A hand held roller is preferred, more preferably a foam roller.

The examples that follow are concerned with glass based glazing structures but this should not be seen as limiting. Other glazing materials such as polycarbonate or poly(methyl)methacrylate may be used in connection with the invention.

Figure 2:
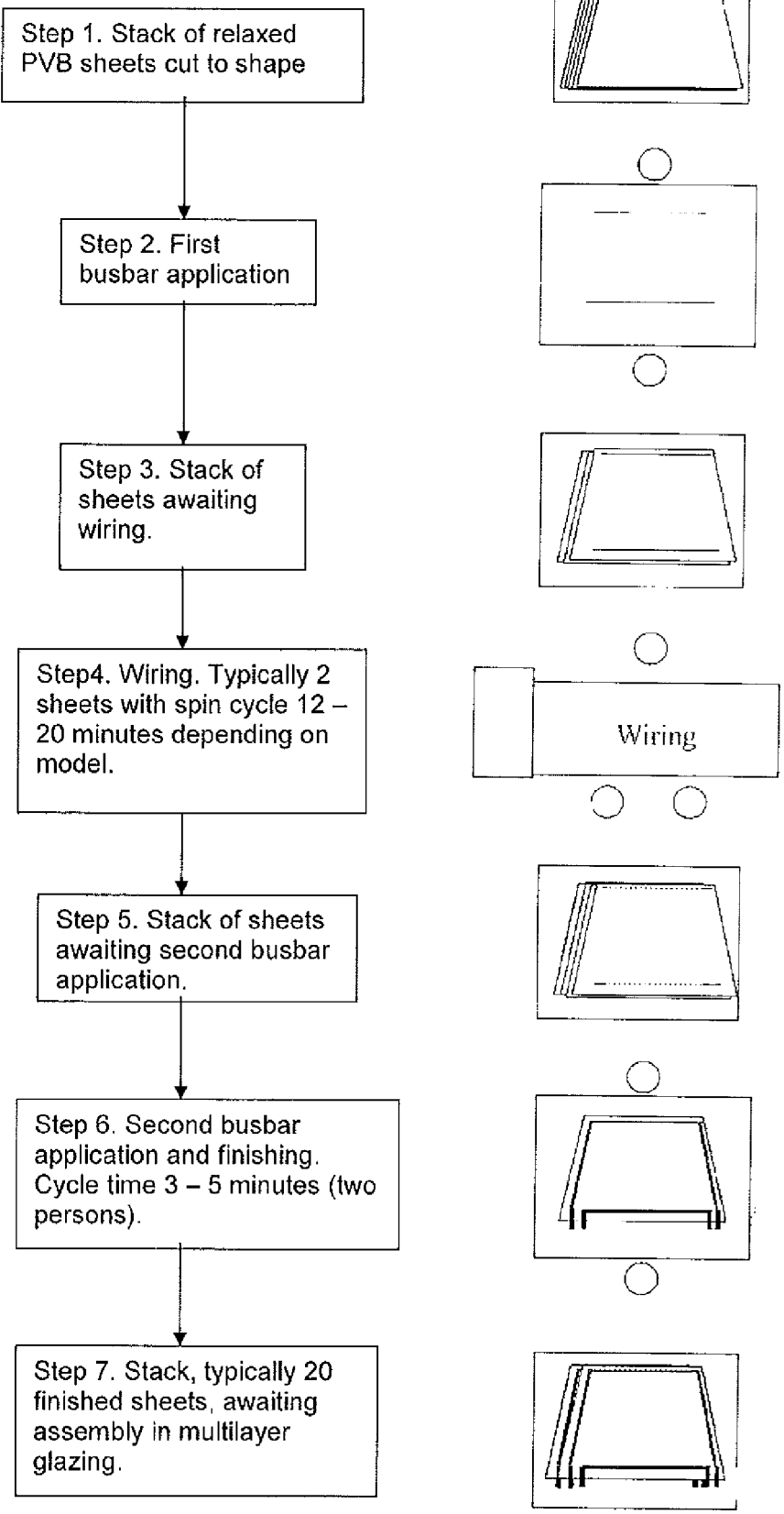

The invention will now be described by non-limiting example, with reference to the following figures in which:

FIG. 1 illustrates a laminated glazing product in whose production, the method of the invention may be employed and FIG. 2 illustrates part of a process for the production of a laminated glazing product.

Referring to FIG. 1, a typical process for the production of a laminated glazing gives rise to an assembly comprising a polymer interlayer 1, sandwiched between layers 2a, 2b, of glazing material such as glass. Wires 3 (e.g. tungsten wires) extend from the main body 3 of the glazing, over (and contacting) a busbar 4 as far as the edge of the laminate. The region 5 where the wire comes to the edge of the structure represents a possible point of entry for water into the assembly.

During the manufacturing process according to the invention, a coating of the polymer material in which the interlayer 1 is formed, is applied on top of the wires in a region 6 before the upper glass sheet is laid in place. The coating is applied as a solution of the polymer in a suitable solvent. The solvent is allowed to evaporate leaving film of the polymer material.

The glazing assembly is subsequently heated (typically during the lamination process) causing the applied polymer coating and interlayer to soften and fuse together. These additional steps provide for improved encapsulation of the wires in the interlayer material with little or no voids remaining to provide a possible route for water ingress.

Region 6 is adjacent the edge of the glazing assembly to which the wires extend. Inclusion of the busbar in region 6 provides additional protection for this part of the circuit and extension of region 6 right to the edge of the glazing provides greater protection against water ingress.

Referring to FIG. 2, during a typical production process for a laminated glazing, PVB sheet material is relaxed for 24 hours and arranged in a stack (step 1) of sheets cut to the desired shape and awaiting further processing.

At step 2, individual sheets are removed from the stack for the first busbar application at step 2. At this stage the minimum application required to facilitate subsequent processing is done.

The sheets with first busbar application are then stacked (step 3) awaiting wiring at step 4. After wiring, the sheets are stacked at step 5, awaiting second busbar application at step 6.

After the second busbar application, the sheets are stacked at step 7, awaiting incorporation in the laminate assemblies.

Application of the polymer solution according to the invention is conveniently done immediately after the second busbar application at step 6, while the sheet is still located on the second busbar table. The applied coating should be dry before the sheets are stacked at step 7 to prevent sticking between sheets.

The second busbar typically takes between three and five minutes to apply which makes it preferable to use a polymer solution with a drying time of less than five minutes, more preferably less than three minutes. Longer drying times than these could lead to delays in the process as drying is awaited before stacking at step 7.

In an alternative approach, two or more "awaiting assembly" stacks could be employed at step 7 but this has implications in terms of space, particularly for existing facilities where the process according to the invention is to be introduced.

The invention will now be further illustrated by the following examples.

Three solutions of polyvinyl butyral in methanol were prepared, having the concentrations listed in table 1.

Solution A was based on 280 g of PVB resin dissolved in 720 g methanol i.e a 40% solution by weight. Solutions B and C were obtained by subsequent dilutions of solution A.

| Solution | Concentration |
|----------|---------------|
| A | 40% |
| B | 20% |
| C | 10% |

Three types of applicator were tested for applying polymer solution to the wire-busbar array, namely a sponge roller, a felt roller and a felt pad/supplied by an attached applicator bottle.

Sample sections of PVB sheet were manufactured with a double busbar sandwich as commonly used in production. The busbars/PVB on these samples were then coated with solutions A-C using the various application methods and the time taken for the adhesive to become dry (to the touch) was recorded. The samples were prepared under standard cleanroom conditions with a temperature of 20±2° C. and humidity of 24±4% RH.

Drying Time Assessment

The drying times for the different application methods and concentrations are shown in table 2.

| Application Method | Solution | Drying time (s) for sample I.D.s 1-6 | | | | | | |
|---|---|---|---|---|---|---|---|---|
| | | 1 | 2 | 3 | 4 | 5 | 6 | Average |
| Pad | A | >180* | >180* | >180* | >180* | >180* | >180* | >180* |
| | B | >180* | >180* | >180* | >180* | >180* | >180* | >180* |
| | C | 23 | 46 | 19 | 12 | 13 | 22 | 22.3 |
| Roller | A | 45 | 52 | 47 | 47 | 49 | 42 | 47.00 |
| | B | 30 | 33 | 29 | 28 | 31 | 32 | 30.50 |
| | C | 16 | 13 | 14 | 19 | 19 | 16 | 16.17 |

*Pad application makes the amount of solution difficult to control, which can lead to thicker polymer layers and longer drying times.

The two different roller applicators gave very similar drying times and the average times are shown above. Solution C was quickest drying with a typical time of approximately 17 seconds. Even the thickest solution applied using a roller was dry within 60 seconds.

The Pad applicator method utilising a hand held applicator bottle was much more difficult to control due to the pressure required to keep the adhesive flowing through the felt wick; particularly for solutions A and B.

These parts required in excess of 3 minutes to dry.

Application of solution using a roller was much easier and quicker than using the felt PAD and bottle. The roller was loaded by immersing approximately one third of the roller in solution prior to removing the excess by rolling onto the textured plastic base plate of the roller tray. The foam roller gave a more uniform coating than the felt fibre roller. The felt fibre roller formed a thicker "ridge" of adhesive from the edges of the roller.

Coating Evaluation

Analysis was carried out on the quality of the resultant coating (wet-out/coverage) for the three different PVB solutions after application to the busbar/PVB.

Samples were manufactured with a standard double busbar construction as used in production and the solutions were applied using a felt PAD applicator for this initial assessment.

The 300×300 mm test parts were laminated with a "Tygaflo" (non stick) coated film adhered to glass surface 3 which allowed the inner glass to be easily removed after autoclave to expose the busbar region and the PVB adhesive over-coat.

Scanning Electron Microscope (SEM) analysis indicated that solution C wetted out to give the most uniform coverage of busbar. Solutions A and B did not fully flow, leaving larger areas of un-protected busbar.

Product Testing

To evaluate the performance of the different concentrations of solution, full size windscreens were manufactured for salt spray testing. The sample parts were manufactured in the Pilkington Automotive Centre of Excellence clean room/wiring facility in Lathom UK. Standard processing conditions were used to mimic volume production.

Samples were made with solutions A-C were applied to the PVB surface using both a felt pad applicator wick and a foam roller. The parts were then tested using an industry standard (DIN 50021) salt spray exposure test for 50 days duration.

During the test, the windscreens are exposed to a continuous 5% salt mist spray in a chamber with a temperature maintained at 35±2° C. The windscreens are powered cyclically 30 min on/off.

The samples were inspected weekly for inoperative wires and signs of salt ingress into the laminate or corrosion of the internal busbars All of the test samples produced passed the test, irrespective of the method of application or solution concentration.

There were no inoperative wires. However, there was a noticeable difference in the level of salt ingress down the tungsten wires (from the glass edge).

The parts manufactured with solution C showed no salt ingress down the wires. The solution A coated product did have some visible salt ingress, although this was not as severe as on the control parts with no coating.

The invention claimed is:

1. A method of manufacturing a laminated glazing sheet, comprising the steps of: arranging one or more wires and a busbar on an interlayer formed from a first thermoplastic polymer; arranging the interlayer and the one or more wires and the busbar between sheets of glazing material to provide a glazing assembly wherein the one or more wires extend over and contact the busbar and continue past the busbar to an edge of the assembly; subjecting the assembly to an elevated temperature sufficient to cause at least partial melting of the first thermoplastic polymer; and prior to arranging the interlayer and the one or more wires and the bus bar between the sheets of glazing material and after arranging the one or more wires and the bus bar on the interlayer, applying a solution of a second thermoplastic polymer in a solvent to the one or more wires in a region of the interlayer adjacent said edge and allowing the solvent to evaporate, leaving a film of the second thermoplastic polymer on the one or more wires including a segment of the one or more wires which extend over and contact the busbar, wherein the second thermoplastic polymer may be the same or different from the first thermoplastic polymer, and wherein the elevated temperature is sufficient to cause at least partial melting of the second thermoplastic polymer and fusion thereof with the first thermoplastic polymer.

2. A method according to claim 1, wherein the first and second thermoplastic polymers are the same.

3. A method according to claim 1, where the solvent and concentration of the solution are selected to provide drying of the applied solution in less than 5 minutes.

4. A method according to claim 3, where the solvent and concentration of the solution are selected to provide drying of the applied solution in less than 3 minutes.

5. A method according to claim 4, where the solvent and concentration of the solution are selected to provide drying of the applied solution in less than 60 seconds.

6. A method according to claim 2, where the thermoplastic polymer comprises polyvinyl butyral (PVB).

7. A method according to claim 6, where the solution comprises methanol as the solvent.

8. A method according to claim 7, where a concentration of PVB in methanol is less than 40% by weight.

9. A method according to claim 8, where the concentration of PVB in methanol is less than 20% by weight.

10. A method according to claim 9, where the concentration of PVB in methanol is between 5% and 15% by weight.

11. A method according to claim 1, where the solution is applied using a hand held roller.

12. A method according to claim 11, where the hand held roller is a foam roller.

13. A method according to claim 1, wherein the glazing material is glass.

* * * * *